United States Patent
Schilling

(10) Patent No.: US 7,882,693 B2
(45) Date of Patent: Feb. 8, 2011

(54) TURBOFAN ENGINE ASSEMBLY AND METHOD OF ASSEMBLING SAME

(75) Inventor: Jan Christopher Schilling, Middletown, OH (US)

(73) Assignee: General Electric Company, Schenectady, NY (US)

( * ) Notice: Subject to any disclaimer, the term of this patent is extended or adjusted under 35 U.S.C. 154(b) by 896 days.

(21) Appl. No.: 11/564,676

(22) Filed: Nov. 29, 2006

(65) Prior Publication Data

US 2008/0120839 A1 May 29, 2008

(51) Int. Cl.
*F02K 3/06* (2006.01)
*F02K 3/072* (2006.01)
(52) U.S. Cl. .......................... 60/204; 60/226.1; 60/268
(58) Field of Classification Search ............... 60/226.1, 60/268, 39.162, 204
See application file for complete search history.

(56) References Cited

U.S. PATENT DOCUMENTS

| 3,673,802 | A | | 7/1972 | Krebs et al. |
| 3,729,957 | A | * | 5/1973 | Petrie et al. ................... 60/268 |
| 3,861,139 | A | * | 1/1975 | Jones ........................... 60/268 |
| 4,751,816 | A | | 6/1988 | Perry |
| 4,817,382 | A | * | 4/1989 | Rudolph et al. ............... 60/268 |
| 5,010,729 | A | * | 4/1991 | Adamson et al. .............. 60/268 |
| 6,339,927 | B1 | | 1/2002 | DiPietro, Jr. |
| 6,619,030 | B1 | | 9/2003 | Seda et al. |
| 6,684,626 | B1 | | 2/2004 | Orlando et al. |
| 6,711,887 | B2 | | 3/2004 | Orlando et al. |
| 6,732,502 | B2 | | 5/2004 | Seda et al. |
| 6,763,653 | B2 | | 7/2004 | Orlando et al. |
| 6,763,654 | B2 | | 7/2004 | Orlando et al. |
| 2004/0198543 | A1 | * | 10/2004 | Christ ........................ 475/163 |
| 2005/0198941 | A1 | * | 9/2005 | Bart et al. .................. 60/226.1 |

\* cited by examiner

*Primary Examiner*—Ted Kim
(74) *Attorney, Agent, or Firm*—William Scott Andes, Esq.; Armstrong Teasdale LLP

(57) ABSTRACT

A turbofan engine assembly includes a core gas turbine engine including a high-pressure compressor, a combustor, and a high-pressure turbine, a first fan assembly disposed upstream from the core gas turbine engine, a first gearbox coupled to the first fan assembly, and a second gearbox coupled to a booster compressor such that the booster compressor rotates in a rotational direction that is opposite to the rotational direction of the first fan assembly. A method of assembling the above turbofan engine assembly is also described herein.

19 Claims, 2 Drawing Sheets

TURBOFAN ENGINE ASSEMBLY AND METHOD OF ASSEMBLING SAME

BACKGROUND OF THE INVENTION

This invention relates generally to gas turbine engines, and more specifically to a turbofan engine assembly that includes a counter-rotating booster compressor.

At least some known turbofan engine assemblies include a fan assembly, a core gas turbine engine, and a low-pressure or power turbine. The core gas turbine engine includes at least one compressor, a combustor, and a high-pressure turbine that are coupled together in a serial flow relationship. Moreover, at least one known turbofan engine assembly includes a booster that is disposed between the fan assembly and the core gas turbine engine.

To increase engine efficiency, at least one known turbofan engine assembly includes a counter-rotating low-pressure turbine that is coupled to a counter-rotating fan assembly. More specifically, to assemble a turbofan engine assembly that includes a counter-rotating low-pressure turbine, an outer rotating spool, a rotating frame, a mid-turbine frame, and two concentric shafts, are installed within the turbofan engine assembly to facilitate supporting the counter-rotating low-pressure turbine. However, while the use of a counter-rotating low-pressure turbine increases the overall engine efficiency, the counter-rotating low-pressure turbine also increases the overall stage count, thus increasing the overall weight, design complexity, and/or manufacturing costs of such an engine are increased.

BRIEF DESCRIPTION OF THE INVENTION

In one aspect, a method of assembling a turbofan engine is provided. The method includes providing a core gas turbine engine including a high-pressure compressor, a combustor, and a turbine, coupling a first gearbox to a first fan assembly, and coupling a second gearbox to a booster compressor such that the booster compressor rotates in a rotational direction that is opposite to the rotational direction of the first fan assembly.

In another aspect, a turbofan engine assembly is provided. The turbine engine assembly includes a core gas turbine engine including a high-pressure compressor, a combustor, and a turbine. The turbofan engine assembly also includes a first fan assembly disposed upstream from the core gas turbine engine, a first gearbox coupled to the first fan assembly, and a second gearbox coupled to a booster compressor such that the booster compressor rotates in a rotational direction that is opposite to the rotational direction of the first fan assembly.

DETAILED DESCRIPTION OF THE INVENTION

Figure 1:
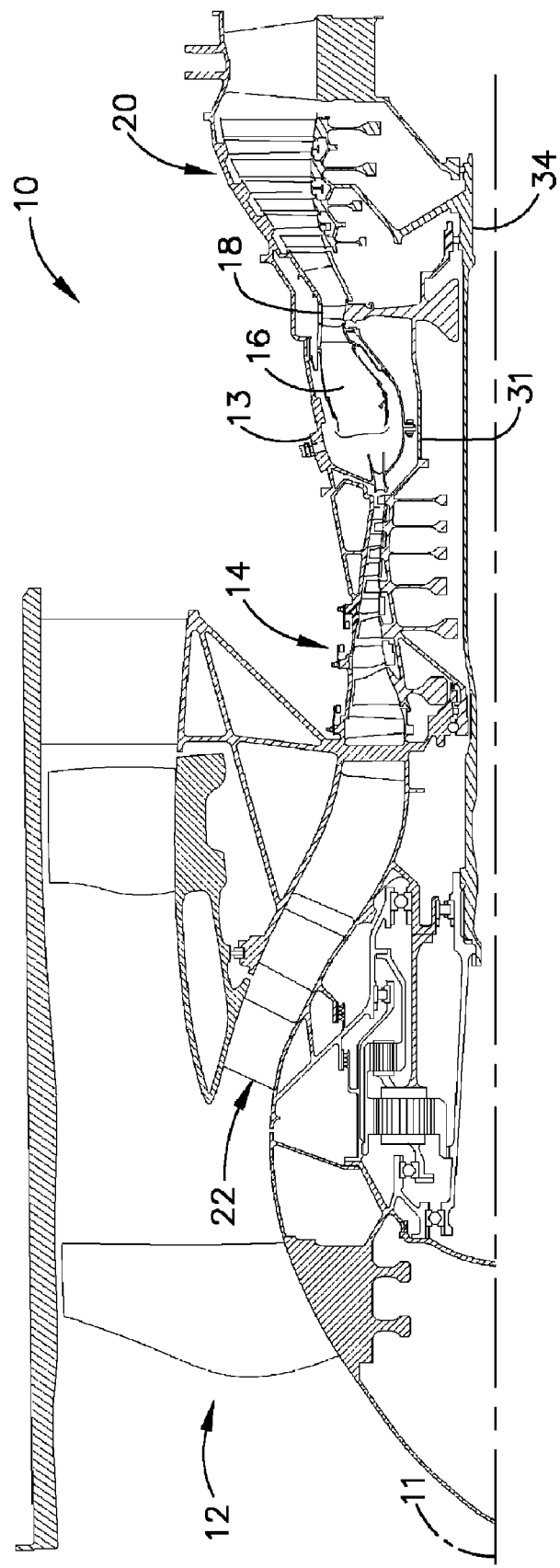
FIG. 1 is a cross-sectional view of an exemplary turbofan engine assembly that includes a counter-rotating fan assembly.

FIG. 1 is a schematic illustration of an exemplary turbofan engine assembly 10 having a longitudinal axis 11. Turbofan engine assembly 10 includes a fan assembly 12, a core gas turbine engine 13 that is disposed downstream from fan assembly 12, and a single-rotation low-pressure turbine 20 that is disposed downstream from the core gas turbine engine. The core gas turbine engine includes a high-pressure compressor 14, a combustor 16, a high-pressure turbine 18, and a first drive shaft 31 that is coupled between high-pressure compressor 14 and high-pressure turbine 18. In the exemplary embodiment, turbofan engine assembly 10 also includes a multi-stage counter-rotating booster compressor 22 that is disposed downstream from fan assembly 12 and upstream from core gas turbine engine 13. Turbofan engine assembly 10 also include a second drive shaft 32 that includes a first end 34 that is coupled or splined to low-pressure turbine 20 and a second end 36 that is coupled or splined to a forward shaft extension 33 that is used to drive both first fan assembly 50, and also drive a plurality of gearboxes which will be discussed below.

In the exemplary embodiment, fan assembly 12 is a counter-rotating fan assembly that includes a first or forward fan assembly 50 and a second or an aft fan assembly 52 that is disposed downstream from forward fan assembly 50. The terms "forward fan" and "aft fan" are used herein to indicate that first fan assembly 50 is coupled axially upstream from second fan assembly 52. In the exemplary embodiment, fan assemblies 50 and 52 are each disposed upstream from core gas turbine engine 13, as shown in FIG. 1. Fan assemblies 50 and 52 each include a respective rotor disk 54 and 56, and a plurality of rotor blades 58 and 60 that are coupled to each respective rotor disk.

Figure 2:
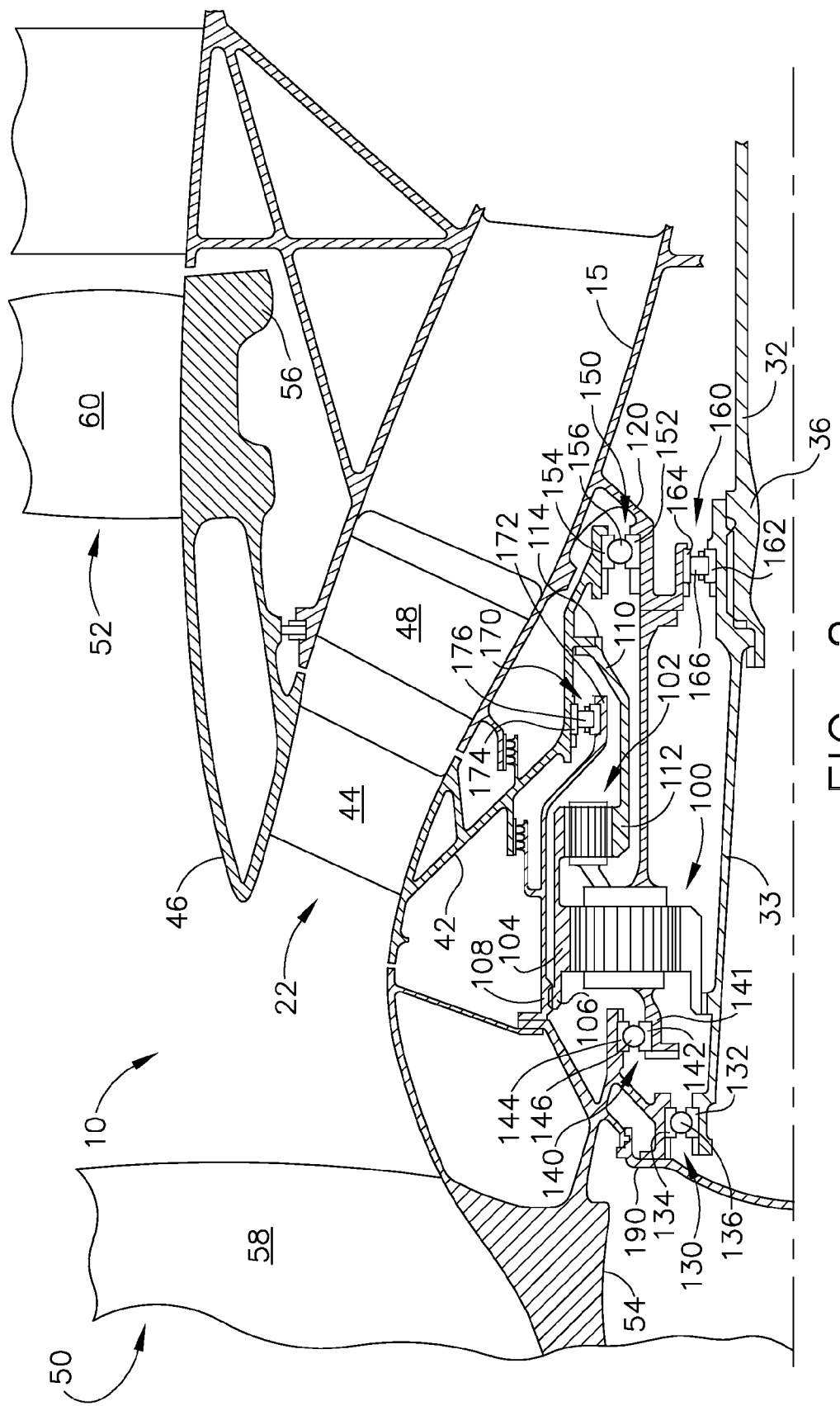
FIG. 2 is an enlarged cross-sectional view of a portion of the exemplary turbofan engine assembly shown in FIG. 1.

FIG. 2 is an enlarged cross-sectional view of a forward portion of the turbofan engine assembly 10 shown in FIG. 1. In this arrangement, booster compressor 22 is a single stage booster compressor that includes a disk 42 and a plurality of rotor blades 44 that are coupled to disk 42. Moreover, the rotor blades 44 are also coupled to a splitter cowling 46, that in disposed radially outwardly from rotor blades 44. In one embodiment, the disk 42, rotor blades 44, and splitter cowling 46 are formed and welded as separate components which are then coupled together. Optionally, disk 42, rotor blades 44, and splitter cowling 46 are cast as a single component. In the exemplary embodiment, turbo fan engine assembly 10 also includes a plurality of outlet guide vanes 48 that are disposed downstream from booster compressor 22 to channel compressed airflow discharged from booster compressor 22 downstream and into core gas turbine engine 13.

In this embodiment, turbofan engine assembly 10 also includes a first gearbox 100 that is driven by low-pressure turbine 20, and a second gearbox 102 that is driven by first gearbox 100. In use, gearbox 100 is disposed upstream from gearbox 102 and is used to drive first fan assembly 50, and gearbox 102 is used to drive both booster compressor 22 and second fan assembly 52.

More specifically, shaft 33 is coupled to an input of gearbox 100 such that low-pressure turbine 20 drives gearbox 100. Moreover, turbofan engine assembly 10 includes a gear shaft 104 that is coupled between gearbox 100 and gearbox 102. More specifically, the gear shaft 104 is splined to shaft 108 and drives gearbox 102 such that the output of gearbox 100 is coupled to the input of gearbox 102 and such that gearbox 100 drives shaft 108. As shown in FIG. 2, a forward end 106 of gear shaft 104 is splined to a first fan assembly drive shaft 108 that is coupled to first fan disk 54 such that gearbox 100 drives first fan assembly 50.

Turbofan engine assembly 10 also includes a second fan assembly drive shaft 110 that includes a first or upstream end 112 and a second or downstream end 114. First end 112 is geared to second gearbox 102 such that gearbox 102 drives drive shaft 110, and second driveshaft end 114 is coupled or splined to cone 42 such that driveshaft 110 drives both booster compressor 22 and second fan assembly 60. As a result, second gearbox 102 is utilized to drive both booster compressor 22 and second fan assembly 60 via drive shaft 110. In the exemplary embodiment, both first and second gearboxes are fixedly coupled to a fan frame 15 utilizing a static support structure 120.

As such, and as shown in FIG. 2, first fan assembly 50 is coupled to gearbox 100 which in turn is coupled to and driven by low-pressure turbine 20. As a result, first fan assembly 50 rotates in a rotational direction that is opposite to the rotational direction of low-pressure turbine 20 and at a different rotational speed based on the gear ratio of gearbox 100. Moreover, second gearbox 102 drives booster compressor 22 and second fan assembly 60 in a rotational direction that is the same as the rotational direction of low-pressure turbine 20 and at a different rotational speed than either the low-pressure turbine 20 or the first fan assembly 60.

In the exemplary embodiment, gearbox 100 has a gear ratio of approximately 2.0 to 1 such that fan assembly 50 rotates at a rotational speed that is approximately one-half the rotational speed of low-pressure turbine 20. In one embodiment, gearbox 102 has an input to output gear ratio of approximately 2 to 1. In another embodiment, gearbox 102 has an input to output gear ratio of approximately 1.25 to 1. In a further embodiment, gearbox 102 has an input to output gear ratio of approximately 1.6 to 1.

Turbofan engine assembly 10 also includes a first bearing assembly 130, that in the exemplary embodiment, is a thrust bearing that is disposed between forward shaft extension 33 and rotor disk 54. More specifically, first bearing assembly 130 is a thrust bearing which includes a rotating inner race 132 that is coupled to forward shaft extension 33, and a rotating outer race 134 that is coupled to rotor disk 54. First bearing assembly 130 also includes a plurality of ball bearings 136 that are disposed between inner and outer races 132 and 134. In operation, first bearing assembly 130 is utilized to provide radial support for rotor disk 54, and thus first fan assembly 50, while still allowing low-pressure turbine 20 to rotate at a different speed that first fan assembly 50. Moreover, bearing assembly 130 minimizes pressure balance differences between the low-pressure turbine 20 and first fan assembly 50.

Turbofan engine assembly 10 also includes a second bearing assembly 140, that in the exemplary embodiment, is a thrust bearing that is disposed between rotor disk 54 and a support structure 141 that is disposed axially upstream from gearbox 100 and coupled to fan frame 15 via support structure 120. More specifically, bearing assembly 140 is disposed upstream from gearbox 100 and includes a stationary inner race 142 that is coupled to support structure 141, and a rotating outer race 144 that is coupled to rotor disk 54. Second bearing assembly 140 also includes a plurality of bearing elements 146 that are disposed between inner and outer races 142 and 144. In operation, second bearing assembly 140 is utilized to substantially absorb the thrust loads generated by first fan assembly 50 and low-pressure turbine 20 and transmit any residual thrust loads to fan frame 15, via support structure 120 and 141. More specifically, bearing assembly 140 reacts the residual thrust generated by first fan assembly 50 and low-pressure turbine 20 through support structure 141 and nets out with the thrust generated by second fan assembly 51 via bearing assembly 150 so that structure 1320 see the net thrust. As such, bearing assembly 140 reacts all of the various axial/thrust loads.

Turbofan engine assembly 10 also includes a third bearing assembly 150, that in the exemplary embodiment, is a thrust bearing that is disposed between support structure 120 and rotor disk 42. More specifically, bearing assembly 150 is disposed downstream from thrust bearing assembly 140, gearbox 100, and gearbox 102, and includes a stationary inner race 152 that is coupled to support structure 120, a rotating outer race 154 that is coupled to disk 42, and a plurality of bearing elements 156 that are disposed between inner and outer races 152 and 154. In operation, third bearing assembly 150 is utilized to substantially absorb the thrust loads generated by booster compressor 22 and second fan assembly 60, and transmit any residual thrust loads to fan frame 15, via support structure 120.

Turbofan engine assembly 10 also includes a fourth bearing assembly 160, that in the exemplary embodiment, is a roller bearing that is disposed between low-pressure turbine shaft 32/forward shaft extension 33 and support structure 120 downstream from gearboxes 100 and 102. More specifically, bearing assembly 160 includes a rotating inner race 162 that is coupled to forward shaft extension 33, and a stationary outer race 164 that is coupled to support structure 120, and a plurality of roller bearings 166 that are disposed between inner and outer races 162 and 164. In operation, fourth bearing assembly 160 is utilized to provide radial support for low-pressure turbine shaft 32/forward shaft extension 33.

Turbofan engine assembly 10 also includes a fifth bearing assembly 170, that in the exemplary embodiment, is a differential bearing that is disposed between rotor disk 42 and first fan assembly drive shaft 108 and rotor disk 42 downstream from gearboxes 100 and 102. More specifically, bearing assembly 170 includes a rotating inner race 172 that is coupled to first fan assembly drive shaft 108, and a rotating outer race 174 that is coupled to rotor disk 42, and a plurality of roller bearings 176 that are disposed between inner and outer races 172 and 174. In operation, fifth bearing assembly 170 is utilized to provide radial support for booster compressor 22 and second fan assembly 60 while still allowing booster compressor 22 and second fan assembly 60 to rotate at a different rotational speed than first fan assembly 50.

A method of assembling turbofan engine assembly 10 includes providing a core gas turbine engine including a high-pressure compressor, a combustor, and a turbine, coupling a first gearbox to a first fan assembly, and coupling a second gearbox to a booster compressor such that the booster compressor rotates in a rotational direction that is opposite to the rotational direction of the first fan assembly.

The turbofan engine assembly described herein includes a counter-rotating fan assembly that is coupled to a pair of epicyclic gearboxes to enable the speed of each fan assembly to be operated at a rotational speed that achieves maximum engine efficiency. In this embodiment, the turbofan engine assembly includes a first gearbox that is driven by the low-pressure turbine. The first gearbox is coupled to the first or forward fan assembly. The turbofan engine assembly also includes a second gearbox that is driven by the first gearbox. The second gearbox is coupled to and thus drives the second fan assembly and the booster compressor. Moreover, the second gearbox enables the booster compressor and second fan assembly to be counter-rotated with respect to the first fan assembly. The second gearbox also enables the rotational speed of the second fan assembly to be varied with respect to the first fan assembly to further increase efficiency and provide an acoustic benefit. As a result, the gearboxes can be easily maintained by removing a cover 190 (shown in FIG. 2), removing the forward shaft 33, and the static support structure 141, allowing the first fan assembly 50 and gearboxes 100 and 102 to be pulled. Additionally, the diameter of the turbofan engine inlet and nacelle may be reduced and the low-pressure turbine may be operated at a relatively high speed.

While the invention has been described in terms of various specific embodiments, those skilled in the art will recognize that the invention can be practiced with modification within the spirit and scope of the claims.

What is claimed is:

1. A method of assembling a turbofan engine assembly comprises:
   providing a core gas turbine engine including a high-pressure compressor, a combustor disposed downstream from the high-pressure compressor, and a high-pressure turbine disposed downstream from the combustor, the high-pressure turbine being coupled to the high-pressure compressor by a first shaft;
   drivingly coupling a first gearbox to a second shaft of a low-pressure turbine, the first gearbox being disposed upstream from the core gas turbine engine, the low-pressure turbine being disposed downstream of the high-pressure turbine, and the second shaft being concentric with the first shaft;
   coupling a first fan assembly to the first gearbox;
   coupling a second gearbox to the first gearbox such that during operation the second gearbox is driven by the first gearbox; and
   coupling a booster compressor to the second gearbox, the booster compressor being disposed downstream from the first fan assembly, wherein the booster compressor rotates in a rotational direction opposite to a rotational direction of the first fan assembly.

2. A method in accordance with claim 1, further comprising coupling a second fan assembly to the booster compressor such that the booster compressor and the second fan assembly rotate in the same rotational direction.

3. A method in accordance with claim 1, further comprising coupling the booster compressor to a splitter and coupling the splitter to the second fan assembly such that the booster compressor and the second fan assembly rotate in the same rotational direction.

4. A method in accordance with claim 1, further comprising coupling a low-pressure turbine to the first gearbox such that the low-pressure turbine drives the first gearbox.

5. A method in accordance with claim 1, further comprising coupling an extension shaft between the first and second gearboxes to enable the first gearbox to drive the second gearbox.

6. A method in accordance with claim 5, further comprising coupling a first drive shaft between the first fan assembly and the first gearbox such that the first gearbox drives the first fan assembly.

7. A method in accordance with claim 1, further comprising coupling the first gearbox to the first fan assembly such that the first fan assembly rotates at a rotational speed that is different than the rotational speed of the low-pressure turbine.

8. A method in accordance with claim 1, further comprising coupling a thrust bearing assembly between the first fan assembly and the low-pressure turbine to minimize pressure balance differences between the low-pressure turbine and the first fan assembly.

9. A method in accordance with claim 1, further comprising coupling a thrust bearing assembly between the booster compressor and a fan frame.

10. A turbofan engine assembly comprising:
    a core gas turbine engine including a high-pressure compressor, a combustor downstream from the high-pressure compressor, and a high-pressure turbine downstream from the compressor, said high-pressure turbine coupled to said high-pressure compressor;
    a first fan assembly coupled within said turbofan engine assembly and located upstream from said core gas turbine engine;
    a first gearbox coupled to said first fan assembly;
    a booster compressor coupled within said turbofan engine assembly and located downstream from said first fan assembly;
    a second gearbox coupled to said booster compressor such that said booster compressor rotates in a rotational direction that is opposite to the rotational direction of said first fan assembly, wherein during operation the second gearbox is driven by the first gearbox; and
    a low-pressure turbine coupled to said first gearbox such that said low-pressure turbine drives said first gearbox.

11. A turbofan engine assembly in accordance with claim 10, further comprising a second fan assembly coupled to said booster compressor such that said booster compressor and said second fan assembly rotate in the same rotational direction.

12. A turbofan engine assembly in accordance with claim 11, further comprising a splitter cowling coupled between said booster compressor and said second fan assembly.

13. A turbofan engine assembly in accordance with claim 12, wherein said second fan assembly is disposed downstream from said booster compressor.

14. A turbofan engine assembly in accordance with claim 10, further comprising an extension shaft coupled between said first and said second gearboxes to enable said first gearbox to drive said second gearbox.

15. A turbofan engine assembly in accordance with claim 14, further comprising a drive shaft coupled between said first fan assembly and said first gearbox such that the first gearbox drives the first fan assembly.

16. A turbofan engine assembly in accordance with claim 10, further comprising a drive shaft coupled between a low-pressure turbine and said first gearbox, said first gearbox coupled to said first fan assembly such that said first fan assembly rotates at a rotational speed that is different than the rotational speed of the low-pressure turbine.

17. A turbofan engine assembly in accordance with claim 10, further comprising a thrust bearing assembly coupled between said first fan assembly and a low-pressure turbine to minimize pressure balance differences between said low-pressure turbine and said first fan assembly.

18. A turbofan engine assembly in accordance with claim 10, further comprising a thrust bearing assembly coupled between said booster compressor and a fan frame.

19. A turbofan engine assembly in accordance with claim 10, further comprising a thrust bearing assembly coupled between said first fan assembly and a stationary support structure to facilitate transmitting residual thrust generated by said first fan assembly and a low-pressure turbine to said stationary support structure.

* * * * *